(12) United States Patent
Munson, Jr.

(10) Patent No.: US 7,322,865 B1
(45) Date of Patent: Jan. 29, 2008

(54) BELT DRIVE PROPULSION SYSTEM

(75) Inventor: David Murray Munson, Jr., Dallas, TX (US)

(73) Assignee: FOI Group, LLC, Dallas, TX (US)

( * ) Notice: Subject to any disclaimer, the term of this patent is extended or adjusted under 35 U.S.C. 154(b) by 0 days.

(21) Appl. No.: 11/546,613

(22) Filed: Oct. 12, 2006

Related U.S. Application Data

(60) Provisional application No. 60/726,974, filed on Oct. 14, 2005.

(51) Int. Cl.
*B60F 3/00* (2006.01)
(52) U.S. Cl. .................................. 440/12.56; 440/12.63
(58) Field of Classification Search ............. 440/12.56, 440/12.63, 12.64
See application file for complete search history.

(56) References Cited

U.S. PATENT DOCUMENTS

| | | | |
|---|---|---|---|
| 3,369,622 A | 2/1968 | Thomas, Sr. | 440/12.63 |
| 3,469,553 A | 9/1969 | Gagne | 440/12.64 |
| 6,505,694 B2 | 1/2003 | Maguire | 180/9.1 |
| 6,983,708 B1 | 1/2006 | Burg | 114/67 R |

*Primary Examiner*—Stephen Avila
(74) *Attorney, Agent, or Firm*—Hemingway & Hansen, LLP; D. Scott Hemingway

(57) ABSTRACT

An apparatus and method for providing propulsion to naval vehicles by using one or more suspended belt drives to consistently engage the water proximate to the surface using a variety of belts with multiple attachments, tires, or variable lugs. The drive belt system incorporates the use of a linear air bearing surface to minimize the belt friction of the drives. This invention also involves the use of open-bottomed enclosures to insulate the propulsion system from adverse water conditions that might otherwise prevent the belt drives from consistently and efficiently engaging the water.

20 Claims, 8 Drawing Sheets

BELT DRIVE PROPULSION SYSTEM

RELATED APPLICATION DATA

This application claims the benefit of U.S. Provisional Application No. 60/726,974 filed Oct. 14, 2005.

TECHNICAL FIELD OF THE INVENTION

An apparatus and method for providing a means of propulsion for boats, amphibious vehicles, and other watercraft by using one or more suspended belt drive units that directly engage the water near the surface.

BACKGROUND OF THE INVENTION

While there is much prior art regarding marine propulsion and transport, propulsion systems for boats have yet to progress beyond the use of propellers, which remain the primary drive for naval vessels. Even the ideal propeller is still an inefficient device and the traditional vessel hull requires rapid increases in power as speed rises. A small pleasure ski boat at 30 mph gets the same fuel economy as a semi truck on the highway. Even modern propellers can have significant cavitation-producing slippage, especially during acceleration. Design characteristics of propellers prevent a single propeller design from achieving low-speed thrust and lift, while still allowing the craft to achieve high maximum speeds. Propellers are similarly limited in their application to amphibious operations or those requiring a vessel to enter shallow depths or waters of unknown composition. Further, noise generated from cavitation, shear and water slippage over propellers can be detected readily.

Challenges arising from adverse aquatic conditions that affect the efficiency of propulsions systems have been present since the first seagoing vessel attempted to navigate rough waters. The unpredictable nature of weather, the presence of waves, and other adverse oceanic conditions have long presented obstacles to those who have attempted to increase the efficiency of naval propulsion systems or the accuracy of navigational methods. None of the prior art has been particularly effective at reducing the myriad of problems caused by waves and rough waters in general. The typical solution to dealing with waves has been to design larger vessels with deep v-type hulls, which require more power and fuel, and still exhibit movement when waves are encountered. The use of such hulls also prevents effective navigation in shallow waters, which in turn limits the effective utility of the vessel.

Friction drag is a force comprised of fluid pressure and shear stress components exerted on a body as it moves through the fluid. Drag can vary greatly in magnitude with velocity and shape of the body. As a ship moves through the water, it creates a water boundary layer that is dragged along with it. The boundary layer is created from the friction between the hull and the displacement of water to the sides of the vessel as it moves through the water. The size of this boundary layer increases with the vessels velocity. Friction drag theoretically increases to the second power of the velocity. As the layer grows in size the vessels effective friction drag surface area is increased, subsequently increasing the fiction force greatly. This friction drag slows the vessel down and requires more power and fuel to achieve higher speeds or traverse necessary distances than if the drag component were reduced. The use of bubbles to reduce friction drag has been proposed, but no one has yet developed a way to effectively implement their use on full size naval vessels. A vessel that could ride on the water surface (instead of being pushed through the water) would eliminate virtually all of the friction drag imposed on tradition navel vessel designs.

This invention eliminates many of these problems by utilizing one or more suspended belt drives to efficiently engage the water and provide for variable speed, thrust, and lift characteristics that changing circumstances and various aquatic environments may require. The suspended belt drives used in this invention can be effectively insulated from the adverse effects caused by waves and rough waters since the drives can be housed in open-bottomed enclosures that allow the drive belts to engage the water in a consistent and efficient manner. An air bearing system incorporated into the drive units will both pressurize the enclosure as well as discharge air bubbles that will reduce the friction drag of the attached enclosure. This feature is assisted by the inclusion of one of several various types of suspension between both the drive unit and the enclosure and the enclosure and the main body of the vessel. Thus, the enclosure is able to move up and down while maintaining a constant buoyancy force. This both helps maintain a more constant, smoother water surface inside the enclosure and stabilize the main body from the effects of waves The use of open-bottomed enclosures as primary flotation components eliminates much of the hull surface area and thus friction. The use of suspension allows the enclosure to provide a constant lift to the main body and maintain a more constant wetted outer hull waterline. The draft of the enclosure can be changed as sea conditions warrant. This invention attempts to reduce water friction as much as possible, with small vessels able to run on top of the water at high speed with much higher efficiency than current designs are able to attain. By increasing the efficiency and effectiveness of the propulsion systems for naval vessels, faster and longer-range ships that consume less fuel are possible.

SUMMARY OF THE INVENTION

This invention provides thrust and lift to vessels through the use of adjustable, water-engaging traction pads that are part of a flexible belt drive. The drive unit is suspended and is capable of moving up and down to maintain contact between the traction pads and the surface of the water and to allow the lower horizontal section of the belt drive to operate on top of the water surface.

Unlike other belt drive systems, this system reduces parasitic friction by having minimal relative velocity between the belt and the engaged water and by preventing the belt drive from being excessively submerged. This second feature greatly improves the efficiency of the belt drive because if the belt drive were submerged below the lower horizontal portion of the drive, it would generate significant vertical forces and turbulence, and if the top portion were submerged, substantial counteracting horizontal forces would be produced as the upper part of the belt would be propelling the water in the opposite direction. Such reduction in counter productive forces and turbulence allows vessels using this drive to achieve much higher rates of speed at greater efficiency levels than are possible using current propulsion methods.

Horizontal linear air bearing surfaces between the drive pulleys allow the belt to transmit vertical loads while it moves with minimal resistance, although water lubricated slides or rollers may also be used. The drive units can also be suspended in open-bottomed enclosures that create a more stable adjustable water level below the surrounding water conditions, which produces lift equal to the water displaced and allows the belt drives to engage the water in the relatively calm conditions inside the enclosure. The pressurized enclosures also provide for floatation when the vessel is stationary or traveling at low speeds with supplemental flotation compartments providing redundancy and long term floating storage capacity. Discharged air from the linear air bearings both pressurizes the enclosure and is vented through ports in lower perimeter of the enclosure to create a layer of air bubbles along the walls of the enclosure that act to reduce friction drag. There is no significant friction between the air-water boundary inside the enclosure so hull friction is lowered relative to a full-bodied vessel, because of the sharp reduction in wetted hull surface. This advantage also allows wider cross-section vessels which increases stability. Therefore, unlike traditional vessel designs, in which the power necessary to move the vessel increases exponentially with speed, the belt drive system can require lower horsepower at higher speeds. As the speed increases, the effective load carrying capacity of the water surface increases. Low surface pressure vessels can be supported entirely by the belt drives at high speed, thereby eliminating hull water friction. Even at lower speeds hull friction is reduced as the belt drive is able to transmit more load to the water surface. In that situation, the vehicle will reduce the required water displacement needed for flotation. Just as traditional hulls rise out of the water, so the enclosures can be shape to minimize wetted hull area if desired.

DETAILED DESCRIPTION OF THE PREFERRED EMBODIMENTS

This invention provides propulsion for naval vehicles through the use of one or more suspended belt drives that utilize flexible belts with multiple attachments or variable lugs to meet changing conditions and requirements.

Figure 1:
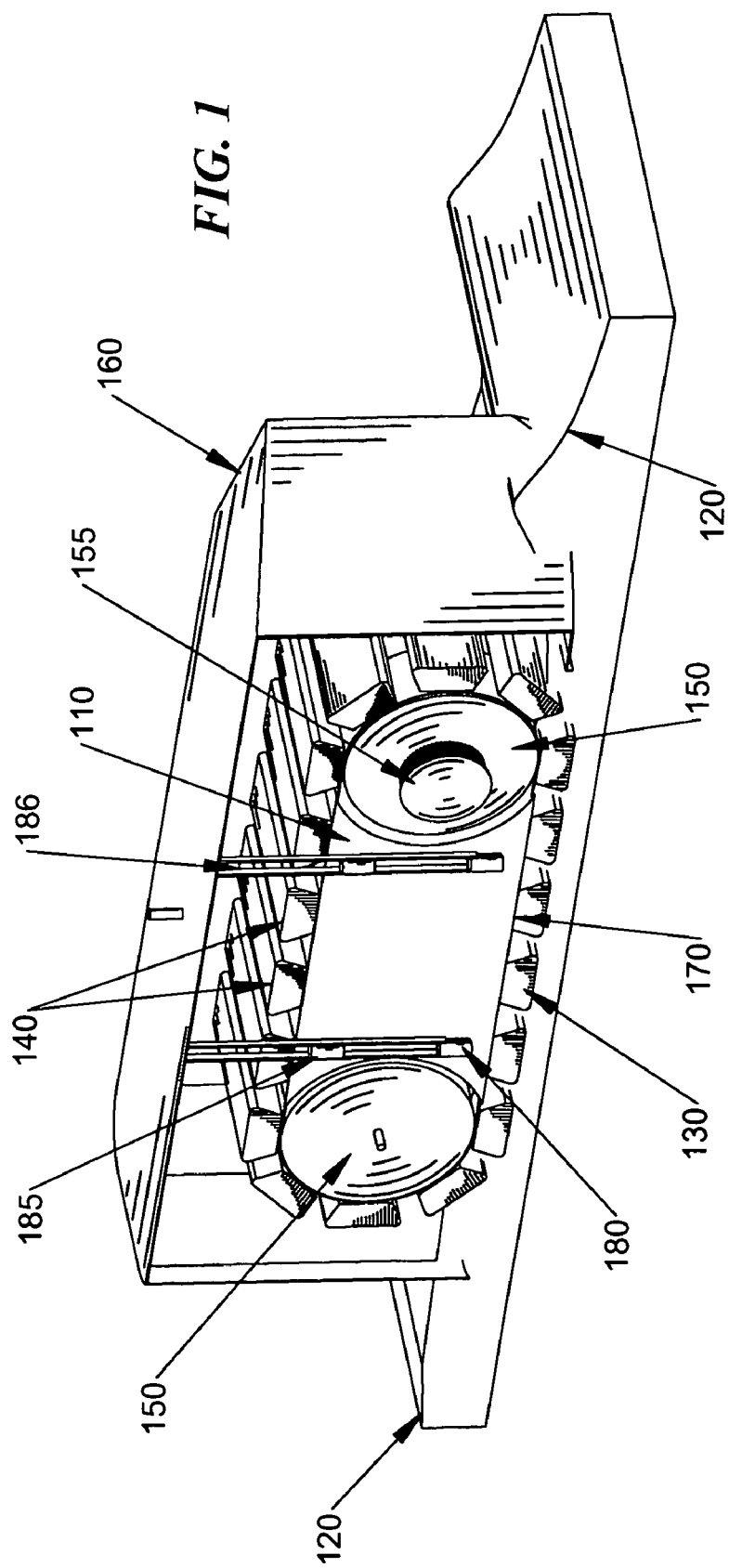
FIG. 1 is a perspective view showing one embodiment of the invention in which a single belt drive unit is encased in an open-bottomed enclosure near the water surface. The belt drive unit engages the water within the enclosure just below the water surface to provide propulsion to the attached vessel.

In one embodiment, as shown in FIG. 1, the belt drive 110 engages the water just above the water surface 120. The flexible belt 130 rotates between dual drive pulleys 150. The belt drive 110 is suspended within the open-bottomed enclosure 160, a feature that allows the drive to move up and down in order to maintain contact between the traction pads 140 and the water surface 120 and to prevent the belt drive from becoming completely submerged below the water surface. Only the force-transferring components of the belt travel below the surface of the water.

One objective of the invention is to minimize friction by having minimal relative velocity between the belt and the water surface. Friction is further decreased by preventing any unnecessary submersion of the drive unit under the water surface 120. This friction is a function of the belt rotation around the pulleys 150, which generates not only propelling force, but also vertical and turbulence forces, which are amplified by any unnecessary submersion of the belt drive. The resulting reduction in friction through preventing such submersion allows the belt drive propulsion system to achieve higher speeds and efficiency than would otherwise be possible. The belt drive is designed to have minimal slip relative to the water once the vessel is underway. The belt drive units can be driven by direct engine or by electrical, fluid, or pneumatic power. The hub or pulley 155 can symbolize either an internal hub drive or a cogged pulley to provide motive power to the drive. The efficiency of the belt drive system is further maximized through the use of an air bearing surface 170 across which the belt travels, which minimizes belt friction and allows the use of lighter, longer, and wider belts. The depicted suspension uses vertical slides 186 mounted to the enclosure 160 and lower 180 and upper 185 rollers, or slides attached to the belt drive unit to control lateral movement while allowing vertical movement by a cylinder or other linear actuator.

Figure 2:
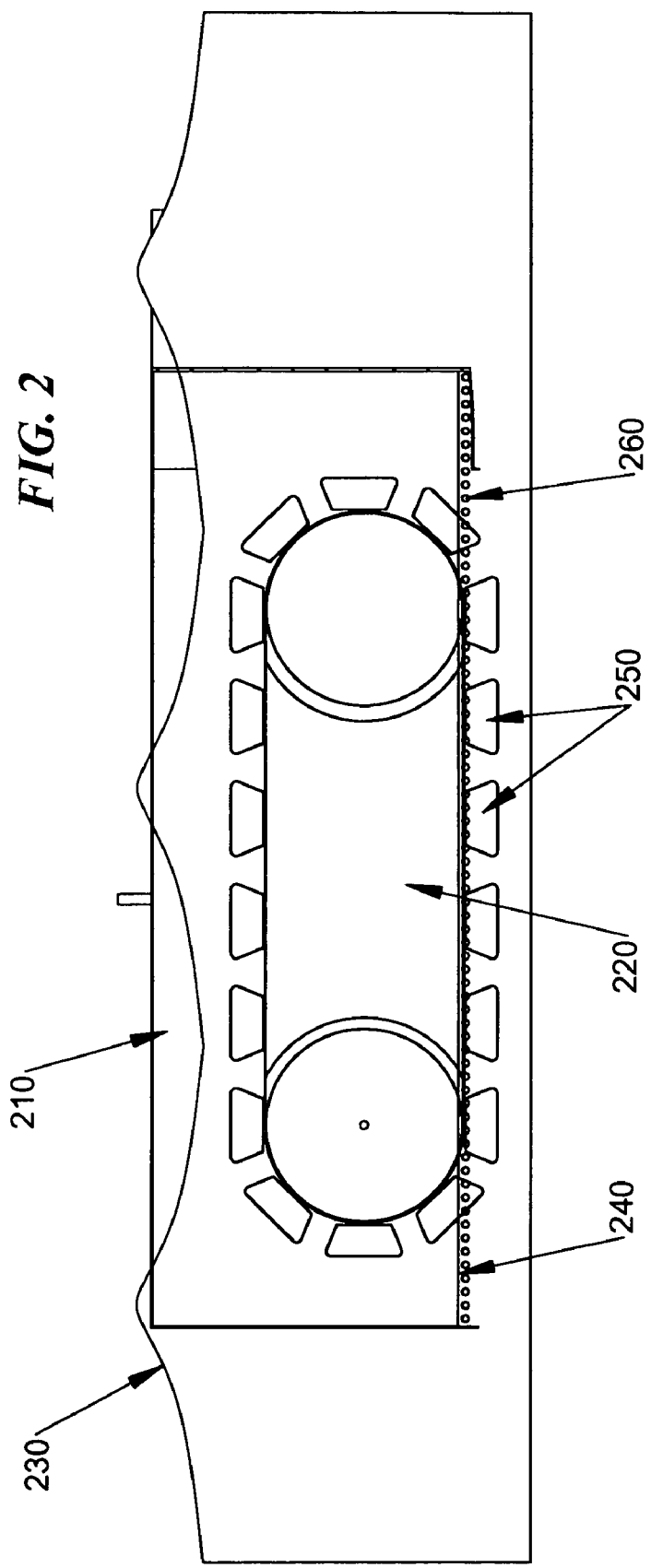
FIG. 2 is an outline view of the invention shown in its submerged state. It shows the belt drive engaging the water surface inside the open-bottomed enclosure although the entire drive unit is completely submerged under the natural water surface. Contact with the water inside the enclosure is limited to the lower portion of the belt directly engaging the water at any given time.

The enclosure can be situated so that the bottom edge of the enclosure is just below the water surface or may be completely submerged, as shown in FIG. 2. Even if completely submerged, the pressurized nature of the enclosure 210 will allow the belt drive 220 to function as if the enclosure were located above the natural water surface 230. The belt drive will engage the water at a surface level 240 near the lower edge of the enclosure even though the entire enclosure is completely submerged. Because the traction pads 250 engage the water on the relatively smooth water surface 240 inside the enclosure, instead of outside the enclosure where waves and rough waters could disrupt its performance, the propulsion method is relatively unaffected by the nature of the waters surrounding the vessel. The ability to isolate the propulsion system from the unpredictable (and generally adverse) conditions present in natural currents is a main feature of this invention.

The enclosure, pressurized in part by the air discharged from the linear air bearing, is used for floatation when the craft is stationary as well as when the vessel is traveling at slow speeds. The air flow from the linear air bearing would result in a downward movement of the interior water surface if air is not released. A series of small holes 260 at the desired interior water level releases excess air in a controlled manner which produces a thin layer of air bubbles along the walls of the enclosure. This thin layer of air reduces hull drag and can be enhanced with small channels and contour to maximize the friction reduction. The enclosure may be entirely filled with one or more drive units or drive units may cover only a small portion of the water surfaces inside the enclosure. In one embodiment, each drive unit can be independently controlled in order to provide steering capabilities to the vessel. Steering is accomplished by either operating units at different speeds or by incorporating physical movement capabilities into each drive unit or enclosure.

Figure 3:
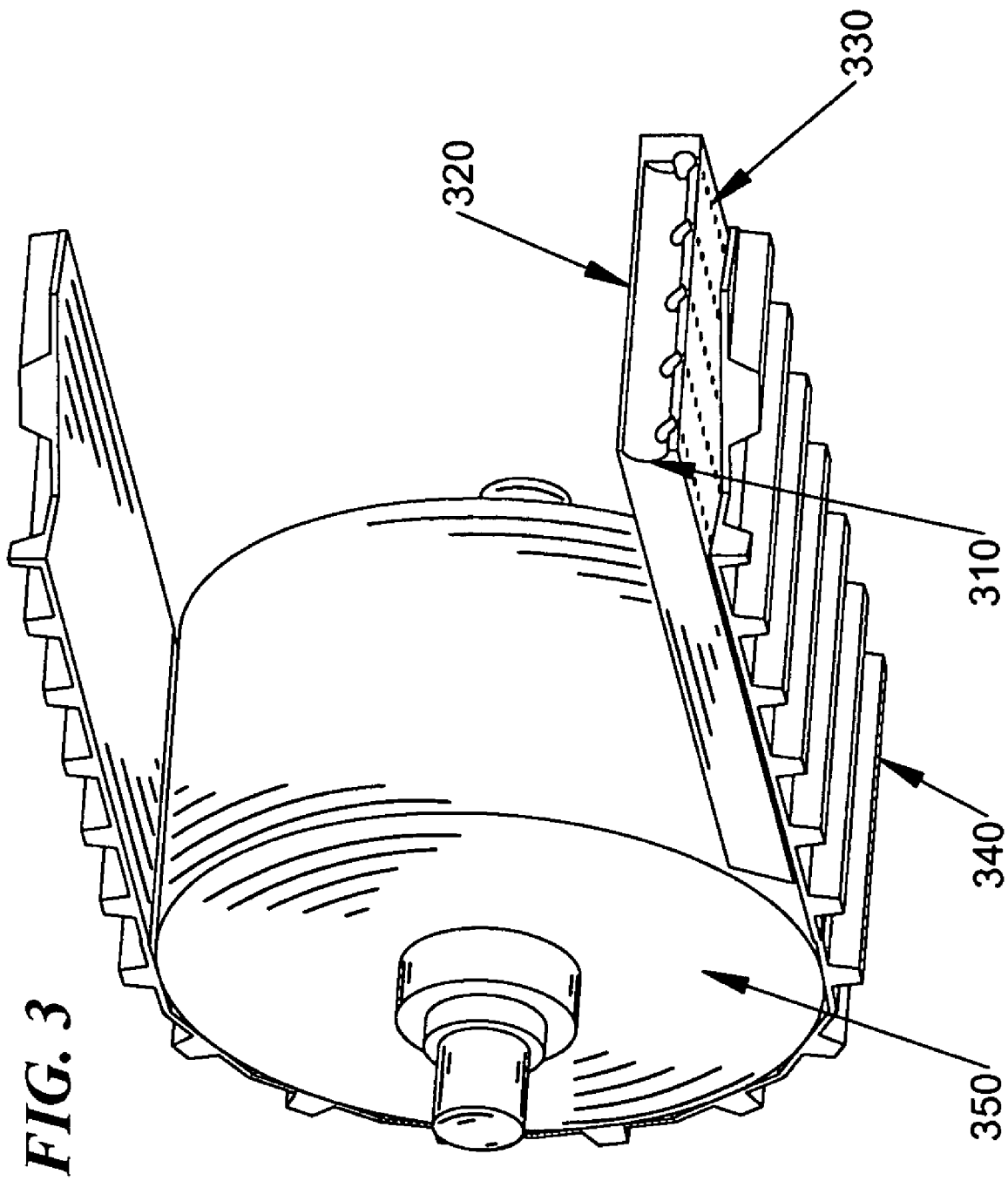
FIG. 3 is an embodiment of the invention that utilizes a linear air bearing to reduce belt friction on the lower portion of the belt.

The linear air bearing, as shown in FIG. 3, operates to minimize belt friction. The air flows through the air supply connection 310 and is routed to the air manifold 320 to be distributed onto the bearing surface through a series of air discharge holes 330 that are located along the slide face. The resulting air bearing then supports the belt 340 as it travels between the drive pulleys 350 of the belt drive unit. Therefore, vertical loads are transmitted from the vessel to the belt across the air bearing surface, while horizontal loads are transmitted by the drive pulleys. Though not shown in FIG. 3, the air bearing system can be utilized on the top portion of the drive unit as well.

The air for the linear air bearing is supplied by a low pressure air source. Turbo-compressors can be powered in any number of ways, including using the exhaust from an internal combustion engine or the exhaust from a gas turbine. An exhaust-driven turbo-compressor has the further advantage of utilizing waste energy that might not otherwise be harnessed for productive use. It is also possible to use other low pressure compressed air sources such as blowers, rotary compressors, the discharge from air motors, or the exhaust from the drive system engine.

Air discharged from the bearing surface is used to maintain enclosure buoyancy and is also vented through air ports located along the sides of the enclosure to minimize water friction between the enclosure and the surrounding water. In large vessels with sidewalls extending thirty feet or more into the water, the belt drives would engage the water surface inside the pressurized enclosure near the bottom of the enclosure, even though the bottom of the enclosure itself is entirely submerged many feet below sea level. In this situation, the air ports that vent the discharged air become extremely advantageous due to the depths at which the boat hulls are traveling and the need to minimize hull friction at those depths, which the venting achieves.

Another embodiment provides for an extremely flexible means of propulsion that can adapt to the environmental conditions or performance objectives of the craft. The flexibility of the belt drives is primarily embodied through the use of variable lugs or multiple belts that provide for varied water-engaging surfaces depending on the speed and power requirements of the vessel. Belts with prominent scoop-type engagements provide excellent low-speed thrust, but become inefficient when operated at higher speeds. Belts with low profile traction pads are efficient at ultimately achieving and maintaining extremely high speeds, but are limited in the amount of low-speed thrust that can be provided. Belts equipped with moderately spaced and sized fins provide for a generally efficient means of propulsion, lacking only the high performance characteristics of the more specialized belts available for use with this invention.

Generally, high speed belts will have minimal engagement surfaces, while low speed varieties will have aggressive engagement surfaces to achieve maximum lift and thrust. For vessels with high design speeds, each separate drive unit can have multiple belts, each with different water engaging devices, to operate under different operating conditions and performance objectives. A low speed, high thrust belt can be retracted from the water surface and stopped when it is not needed, and a high speed, low thrust belt used alone to maximize system efficiency at high speed.

Figure 4:
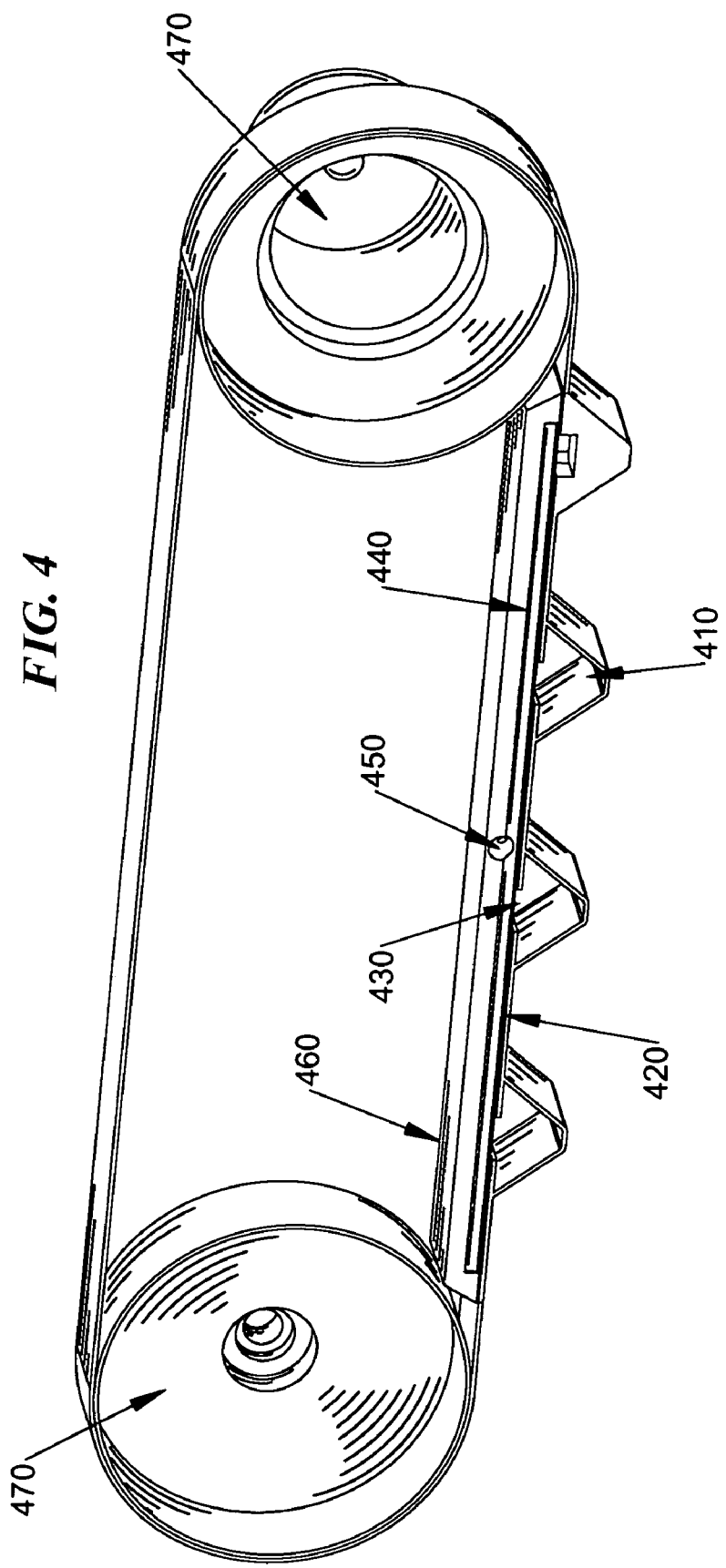
FIG. 4 shows a drive belt unit that uses inflatable lugs as the engagement surface on the belt.

In one embodiment, as shown in FIG. 4, the belt drive surface is populated with variable or inflatable engaging lugs 410 that allow continuous adjustment of traction pad characteristics, depending on the nature of the aquatic environment and the desired performance characteristics of the craft. Only the lower portion of these adjustable depth lugs 410 are shown. They can be maximized at startup and at low speeds, where maximum power and water engagement is required by raising the inflation pressure. The lugs are then retracted or deflated at higher speeds to maximize the efficiency of the propulsion system and to allow the vessel to achieve maximum speeds uneconomically attainable at extended lug settings. FIG. 4 shows the inflatable lugs 410 which use the linear air bearing system's air supply 450 to inflate the lugs. An air port 430 in the belt slidably connects to a linear channel 440. The channel is supplied with regulated pressure by the air bearing air supply 450. This allows air to fill, or partially fill, the hollow lug attachment 410. The linear air bearing system continues to perform its function by utilizing the same air supply 450 to transfer air to the air manifold assembly 460 and out to the air discharge holes 420. This ability to change pressurization of the hollow lug attachment allows the vehicle to adapt to different travel surfaces and conditions. The adjustable inflation process can be performed while the drive unit is in use. Furthermore vacuum can be provided to further retract the inflatable lug if needed. In most cases elastic material and or springs will be satisfactory. If desired the lugs can be designed to deflate as they begin to travel around the rear drive roller 470 to minimize water retention and turbulence.

Figure 5:
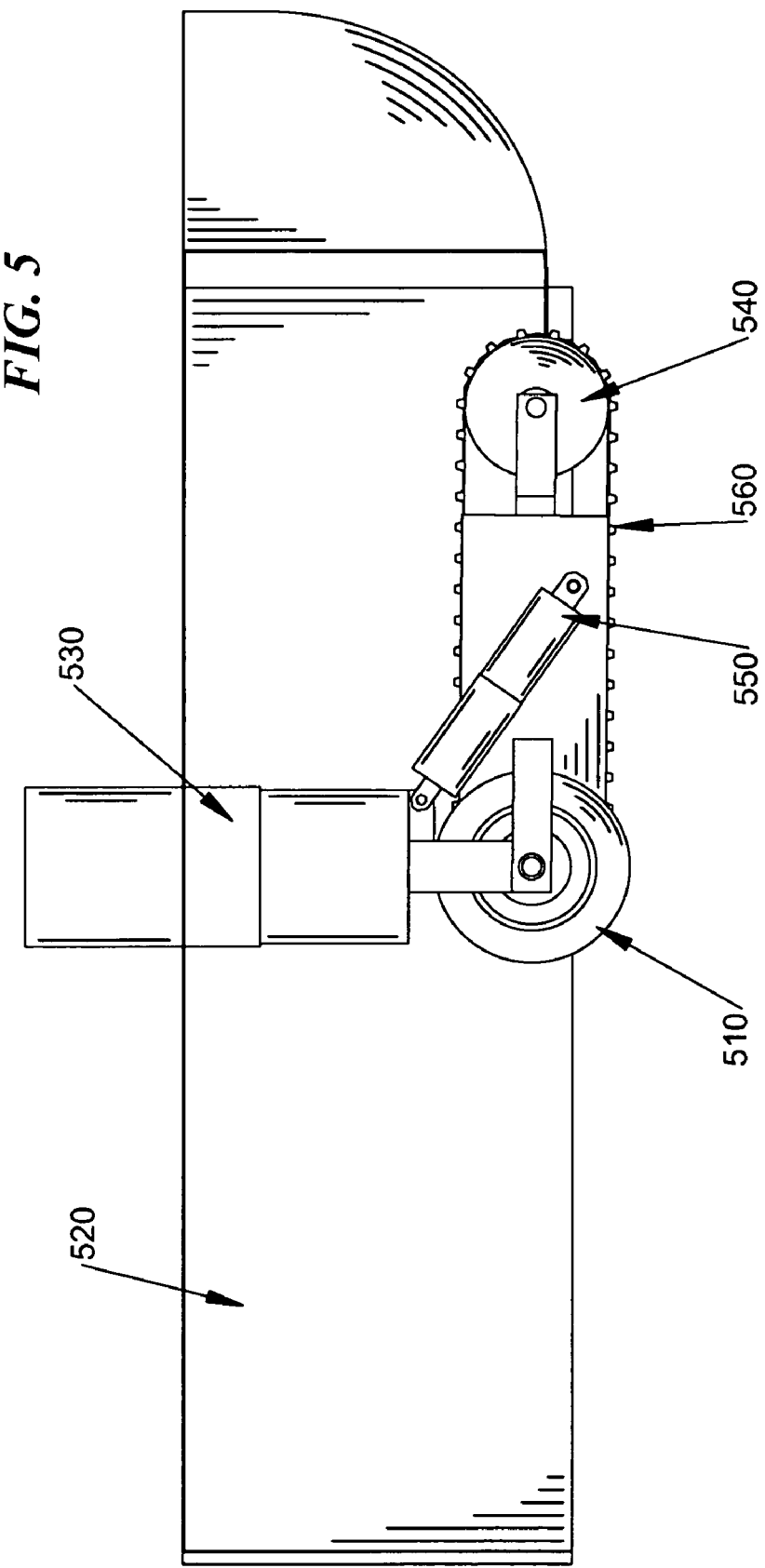
FIG. 5 is an embodiment of the invention that shows a belt drive assembly that utilizes a tire as the engagement device.

One embodiment, as shown in FIG. 5, shows a more traditional tire transport mechanism to be used as part of the belt drive system. The tire 510 is attached to each side of the belt drive system which is suspended by an air cylinder 530 within the open-bottomed enclosure 520. The rear pulley of the belt drive is concentric with the larger diameter tire and both are powered together. On hard surfaces the tire carries the load, while in soft ground or water the belt provides propulsion. The front pulley 540 is able to be elevated above the travel surface on hard surfaces to avoid damage to the belt 560 and allow the tire to move and steer freely. This elevation is accomplished through the contraction of a lift cylinder 550 that is mechanically connected to the air cylinder framework and the belt drive unit. It is possible to separate the tire and belt portions so they might more independently with separate steering, suspension and drive systems.

Figure 6:
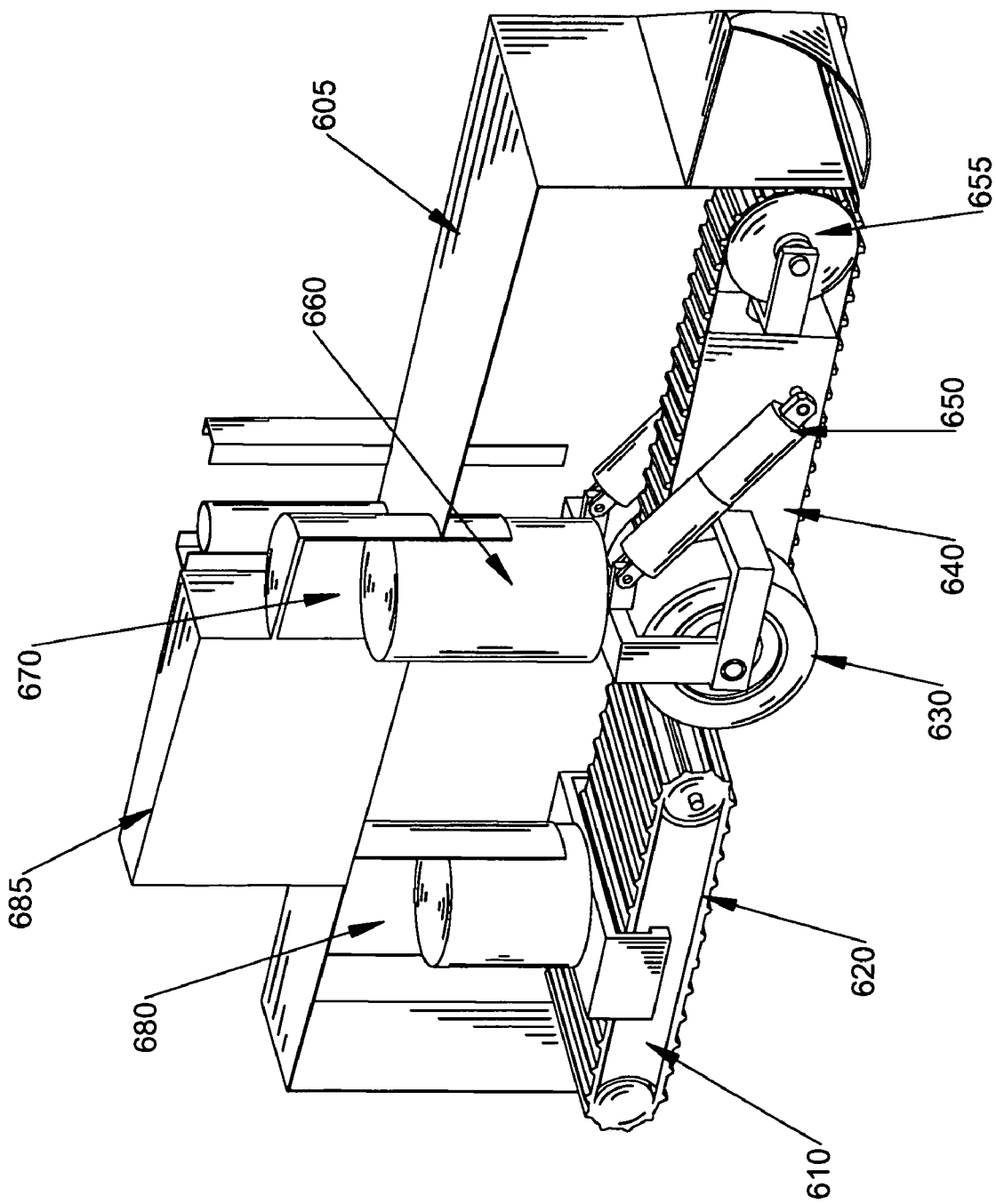
FIG. 6 is a cutaway drawing of an embodiment of the invention that includes multiple drives in a single enclosure to allow for multiple engagement surfaces depending on the surface environment to be traversed.

Another embodiment of the invention, as shown in sectional view in FIG. 6, combines two belt drive units with different designs into a single enclosure 605. The wide belt drive unit 610 can be used for low speed applications utilizing the same belt drive design incorporating the linear air bearing surface 620. The narrow belt drive unit 640 uses a single tire on each side to facilitate travel on land or hard decks. A lift cylinder 650 connects the front frame of the belt drive unit to the support frame in order to lift the front roller 655 of the belt drive unit above the contact surface. In this way, only the tire 630 comes into contact with the hard travel surface. Steering can be accomplished by rotation of the air chamber 660 connected to the tire belt drive unit 640.

FIG. 6 additionally shows an example of one embodiment of the suspension system used in conjunction with the belt drives. In this embodiment, an air cylinder 670 or an air chamber 680 can be used to move the drive units up and down to engage the travel surface. The ability to move the drive units vertically to maintain most efficient position is critical. While this can be accomplished by manual control, the invention will likely also incorporate the use of sensors to detect the level of the engagement surface and to send feedback to a control unit or sensor display for automated level control. Depending on the nature of the control required, the suspension actuators can be electrical or fluid-powered, in addition to the air powered system shown in FIG. 6. A power and control enclosure 685 provides drive power and suspension either using fluid power thru flexible hose or rotary sliding connections or other transmission method. Power transmission fluids can be air, water, or oil. Electric drives maybe desirable on multiple drive applications, while a direct engine drive would likely be used for single or small applications.

Figure 7:
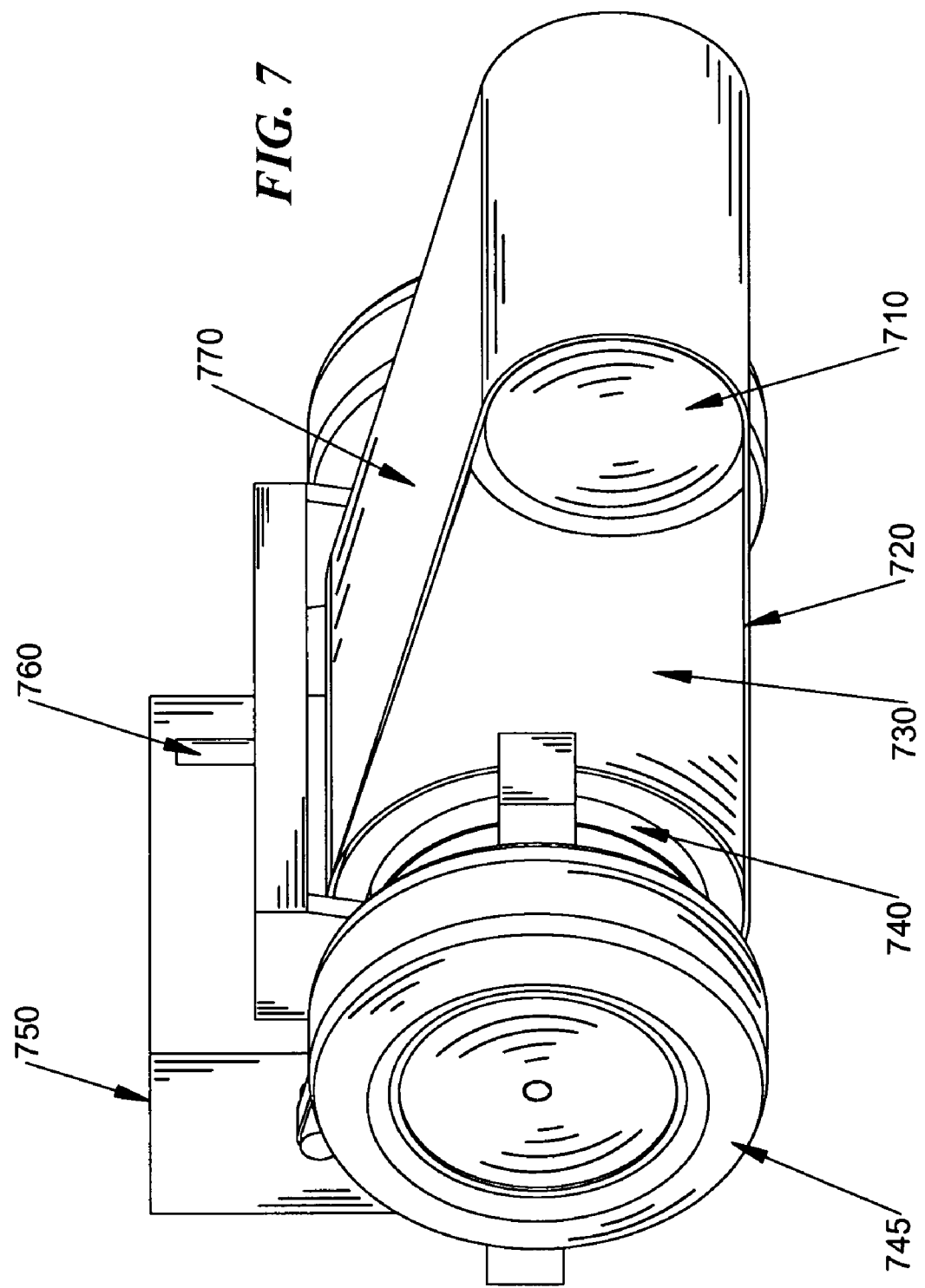
FIG. 7 is another embodiment of a belt drive unit that is powered by an engine that is attached to the frame of the drive.

FIG. 7 shows another embodiment of the belt drive without drive belt engagement pads or lugs included in the drawing. This belt drive has a front idler wheel 710 that is smaller than the rear drive roller 740 and it has larger diameter tires 745 attached outboard of the belt. The smaller front idler allows the front to be raised without requiring extra room inside the enclosure. The framework between the rollers supports the linear air bearing 720 and can provide an attachment point for a cylinder to rotate the framework about the axis of drive roller 740. The belt and tire combination drive is powered by the engine/transmission 750 that is mounted in an enclosure attached to the unit. A steering pivot 760 allows for steering capabilities for each drive unit. The drive belt 770 rotates around the pulleys (traction pads, fins, lugs, etc. not shown on this drawing) and the belt drive is able to pivot about its axle in this embodiment. Lift cylinders not shown in this figure can raise and lower the front of the belt as conditions warrant.

Figure 8:
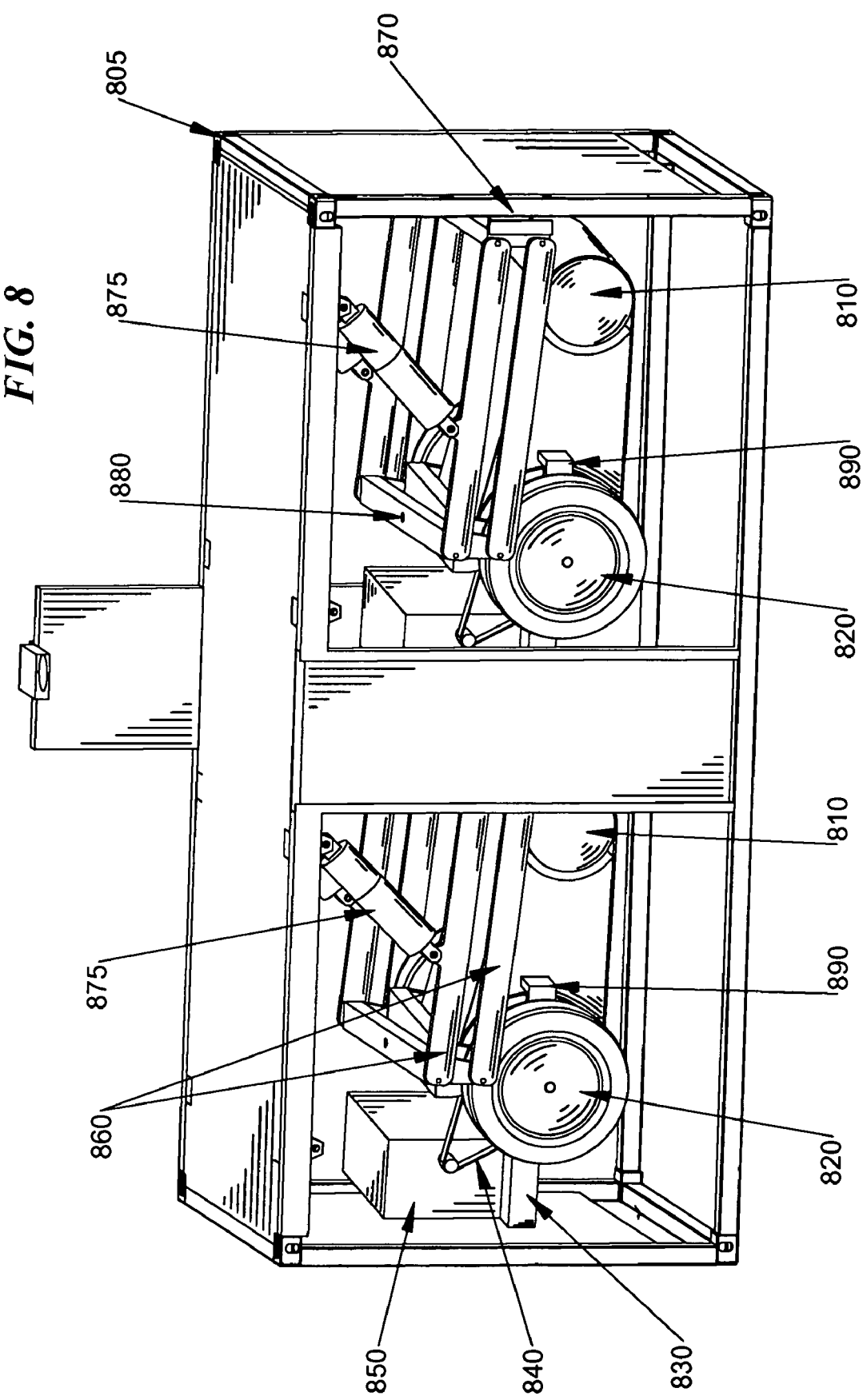
FIG. 8 shows the interior of a belt drive enclosure in which two of the belt drive units shown in FIG. 7 are contained in a single enclosure.

FIG. 8 shows a perspective view of a dual drive apparatus utilizing the drive embodiments shown in FIG. 7. The drive container 805 shown is configured as a 20 foot container that complies with ISO regulations. Both the front idler wheel 810 and the drive roller 820 can engage the surface. As in FIG. 7, traction pads, fins, or inflatable lugs that will populate the surface of the belt are not shown on this drawing for simplicity. The belt drive frame 830 connects the drive unit to the engine/transmission enclosure 850. The engine/transmission powers the belt drive by through the use of a separate belt 840 that engages the drive roller 820. Gear drives, hydrostatic drives, air drive units, and electric motors could be used if desired. Suspension link rods 860 connect the drive units to the enclosure frame 870. Tandem lift cylinders 875 can be hydraulic or air operated to maintain proper engagement during water operation and lift the enclosure above the ground during land travel. Other linear actuators could be used in place of the cylinders. A top swivel mount 880 gives each belt drive unit steering capabilities and the belt support section of the apparatus 890 uses a cylinder to raise and lower front portion of belt to ensure alignment and contact of the drive belt with the engaged travel surface Having described the invention, I claim:

1. A propulsion system for a marine vehicle comprising:
   a vehicle housing defined by a horizontal top surface and surrounding vertical side walls that define an external cover and an open-bottom internal enclosure area, said internal enclosure area being locatable over, at, or under a water surface;
   one or more suspension supports extending from the housing into the internal enclosure area;
   a flexible belt drive assembly attached to said suspension supports in the internal enclosure area and having a belt with water engaging surfaces on the exterior belt surface to engage the water surface and provide the marine vehicle with a thrust force along the plane of the water surface, said belt assembly having a linear air bearing surface to minimize the belt friction of the drives;
   at least two roller assemblies spatially separated from each other with the belt wrapped around each roller assemblies in a looped manner so that the belt rotates around said roller assemblies and engages the water surface on a lower plane of the belt drive assembly; and
   a driver coupled to the belt drive assembly for driving the rotation of the belt around the roller assemblies.

2. The propulsion system of claim 1 wherein said internal enclosure area insulates the propulsion system from adverse water conditions that might otherwise prevent the belt drives from consistently and efficiently engaging the water surface.

3. The propulsion system of claim 1 further comprising:
   a rotational motor drive connected to the belt drive assembly to provide independent directional control to the vehicle.

4. The propulsion system of claim 1 further comprising:
   inflatable traction elements on the belt that regulate the engagement of the belt drive assembly with the water surface.

5. The propulsion system of claim 1 further comprising:
   retractable vane elements on the belt that regulate the engagement of the belt drive assembly with the water surface.

6. A propulsion system for a marine vehicle comprising:
   a vehicle housing defined by a horizontal top surface and surrounding vertical side walls that define an external cover and an open-bottom internal enclosure area, said internal enclosure area being locatable over, at, or under a water surface;
   one or more powered suspension units extending from the housing into the internal enclosure area;
   a flexible belt drive assembly attached to said suspension supports in the internal enclosure area and having a belt with water engaging surfaces on the exterior belt surface to engage the water surface and provide the marine vehicle with a thrust force along the plane of the water surface;
   at least two roller assemblies spatially separated from each other with the belt wrapped around each roller assemblies in a looped manner so that the belt rotates around said roller assemblies and engages the water surface on a lower plane of the belt drive assembly; and
   a driver coupled to the belt drive assembly for driving the rotation of the belt around the roller assemblies, and a rotational motor drive connected to the belt drive assembly to provide independent directional control to the vehicle.

7. The propulsion system of claim 6 further comprising:
   an air cushion assembly acting as the powered suspension unit coupled to the belt drive assembly, said air cushion assembly regulates the engagement of the belt drive assembly with the water surface.

8. The propulsion system of claim 6 further comprising:
   an pneumatic assembly acting as the powered suspension unit coupled to the belt drive assembly, said pneumatic assembly regulates the engagement of the belt drive assembly with the water surface.

9. The propulsion system of claim 6 further comprising:
   an electrical powered assembly acting as the powered suspension unit coupled to the belt drive assembly, said suspension unit assembly regulates the engagement of the belt drive assembly with the water surface.

10. The propulsion system of claim 6 further comprising:
an air-supported linear bearing that provides a sliding support surface for the belt on the belt drive assembly.

11. The propulsion system of claim 6 further comprising:
an air input mechanism that provides a high air pressure pocket inside the internal enclosure to provide a vertical lift force for the vehicle perpendicular to the plane of the water surface.

12. The propulsion system of claim 6 further comprising:
an air input mechanism that vents exhaust from the driver into a high air pressure pocket inside the internal enclosure to provide a vertical lift force for the vehicle perpendicular to the plane of the water surface.

13. A method of providing propulsion to a marine vehicle comprising the steps of:
providing a vehicle housing defined by a horizontal top surface and surrounding vertical side walls that define an external cover and an open-bottom internal enclosure area, said internal enclosure area being locatable over, at, or under a water surface;
supporting at least one belt drive assembly from the housing inside the internal enclosure area, each of the belt drive assemblies having at least two roller assemblies spatially separated from each other with the belt wrapped around one of two roller assemblies in a looped manner, said belt drive assembly includes a linear air bearing surface to minimize the belt friction of the drives;
engaging the water surface on a lower plane of the belt drive assembly as the belt rotates around the roller assemblies with water engaging surfaces on the exterior belt surface to engage the water surface and provide the marine vehicle with a thrust force along the plane of the water surface;
driving the belt on the belt assembly with a driver unit coupled to the belt drive assembly.

14. The method of propulsion in claim 13 wherein said internal enclosure area insulates the propulsion system from adverse water conditions that might otherwise prevent the belt drives from consistently and efficiently engaging the water surface.

15. The method of propulsion in claim 13 further comprising the steps of:
rotating the belt drive assembly to provide independent directional control to the vehicle.

16. The method of propulsion in claim 13 further comprising the steps of:
providing inflatable traction elements on the belt that regulate the engagement of the belt drive assembly with the water surface.

17. The method of propulsion in claim 13 further comprising the steps of:
providing retractable vane elements on the belt that regulate the engagement of the belt drive assembly with the water surface.

18. The method of propulsion in claim 13 further comprising the steps of:
providing support for the belt drive assembly with an air cushion assembly to regulate the engagement of the belt drive assembly with the water surface.

19. A method for propelling a marine vehicle comprising:
providing a propulsion housing having a top horizontal surface with enclosing vertical side walls descending that define an external cover and an open-bottom internal enclosure positioned over, at, or under a water surface;
attaching one or more suspension supports from the housing extending into the internal enclosure;
powering a flexible belt drive assembly attached to said suspension supports in the internal enclosure to contact a water surface and engage the water surface so as to provide the marine vehicle with a parallel thrust force to the plane of the water, said drive assembly having a linear air bearing surface to minimize the belt friction of the drives;
providing at least two roller assemblies spatially separated from each other with the belt looping around each roller assembly so that the belt rotates around said each roller assembly to and engage the water surface; and
coupling a driver to the belt drive assembly for driving the rotation of the belt around the roller assemblies.

20. A method for marine propulsion comprising:
providing at least one powered suspension units extending from a housing unit into an the internal enclosure isolating a drive assembly from adverse water conditions that might otherwise prevent a component belt drive from consistently and efficiently engaging the water surface;
attaching a flexible belt drive assembly to a suspension support in the internal enclosure and having a belt with water engaging surfaces on the exterior belt surface to engage the water surface and provide the marine vehicle with a forward thrust force along the plane of the water;
providing at least two roller assemblies spatially separated from each other with the belt wrapped around each roller assembly in a looped manner so that the belt rotates around said roller assemblies and engages the water surface on a lower plane of the belt drive assembly;
coupling a driver to the belt drive assembly for driving the rotation of the belt around the roller assemblies; and
connecting a rotational motor drive to the belt drive assembly to provide independent directional control.

* * * * *